United States Patent
Banikazemi et al.

(10) Patent No.: US 10,616,102 B2
(45) Date of Patent: *Apr. 7, 2020

(54) MANAGEMENT OF UNREACHABLE OPENFLOW RULES

(71) Applicant: INTERNATIONAL BUSINESS MACHINES CORPORATION, Armonk, NY (US)

(72) Inventors: Mohammad Banikazemi, New York, NY (US); David P. Olshefski, New York, NY (US); John M. Tracey, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

This patent is subject to a terminal disclaimer.

(21) Appl. No.: 14/744,613

(22) Filed: Jun. 19, 2015

(65) Prior Publication Data
US 2016/0344624 A1 Nov. 24, 2016

Related U.S. Application Data

(63) Continuation of application No. 14/716,292, filed on May 19, 2015.

(51) Int. Cl.
*H04L 12/717* (2013.01)
*H04L 12/743* (2013.01)
(Continued)

(52) U.S. Cl.
CPC ............. *H04L 45/42* (2013.01); *H04L 41/00* (2013.01); *H04L 41/0866* (2013.01); *H04L 45/7457* (2013.01); *H04L 45/64* (2013.01)

(58) Field of Classification Search
CPC ..... H04L 45/42; H04L 41/00; H04L 41/0866; H04L 45/7457; H04L 45/64
See application file for complete search history.

(56) References Cited

U.S. PATENT DOCUMENTS

2004/0073703 A1* 4/2004 Boucher ................. H04L 69/16
370/474
2006/0056412 A1* 3/2006 Page ....................... H04L 45/02
370/392

(Continued)

FOREIGN PATENT DOCUMENTS

WO WO2012130523 10/2012

OTHER PUBLICATIONS

List of IBM Patents or Patent Applications Treated as Related.
Zeng, et al., "Automatic Test Packet Generation", ACM Co-Next, Dec. 2012, pp. 241-252.

*Primary Examiner* — Gregory B Sefcheck
*Assistant Examiner* — Joshua Smith
(74) *Attorney, Agent, or Firm* — Tutunjian & Bitetto, P.C.; Kevin Jordan

(57) ABSTRACT

Methods and systems are provided. A method includes managing, by a software defined network (SDN) controller, OpenFlow rules stored on an OpenFlow network device having a ternary content addressable memory (TCAM). The OpenFlow rules include unreachable OpenFlow rules and reachable OpenFlow rules. The managing step includes querying at least one OpenFlow rule from among the unreachable OpenFlow rules and the reachable OpenFlow rules on the at least one OpenFlow network device. The managing step further includes determining whether any of the OpenFlow rules are reachable or unreachable from indicia used to mark the OpenFlow rules as reachable or (Continued)

unreachable. The managing step also includes causing a removal of the unreachable OpenFlow rules from the OpenFlow network device.

8 Claims, 7 Drawing Sheets

(51) Int. Cl.
*H04L 12/24* (2006.01)
*H04L 12/715* (2013.01)

(56) References Cited

U.S. PATENT DOCUMENTS

| | | | | |
|---|---|---|---|---|
| 2008/0028467 A1* | 1/2008 | Kommareddy | ..... | H04L 63/1458 726/23 |
| 2008/0031239 A1* | 2/2008 | Kapoor | ..... | H04L 45/02 370/389 |
| 2008/0313339 A1* | 12/2008 | Faucher | ..... | H04L 49/90 709/227 |
| 2009/0073996 A1* | 3/2009 | Swallow | ..... | H04L 45/02 370/401 |
| 2010/0296486 A1* | 11/2010 | Sansone | ..... | H04W 8/26 370/331 |
| 2010/0325257 A1* | 12/2010 | Goel | ..... | H04L 29/12028 709/223 |
| 2011/0188506 A1 | 8/2011 | Arribas et al. | | |
| 2011/0201343 A1 | 8/2011 | Pinheiro et al. | | |
| 2011/0223881 A1* | 9/2011 | Brok den | ..... | H04W 4/22 455/404.2 |
| 2012/0236761 A1 | 9/2012 | Yang et al. | | |
| 2013/0179821 A1* | 7/2013 | Bauer | ..... | H04L 41/069 715/772 |
| 2013/0194914 A1* | 8/2013 | Agarwal | ..... | H04L 45/245 370/225 |
| 2013/0254421 A1 | 9/2013 | Mondaeev et al. | | |
| 2013/0279909 A1 | 10/2013 | Srinivas et al. | | |
| 2013/0282766 A1 | 10/2013 | Goyal et al. | | |
| 2013/0318243 A1* | 11/2013 | Chinthalapati | ..... | H04L 45/52 709/226 |
| 2014/0089506 A1* | 3/2014 | Puttaswamy Naga | ..... | H04L 45/42 709/225 |
| 2014/0325649 A1* | 10/2014 | Zhang | ..... | H04L 43/024 726/23 |
| 2016/0050117 A1* | 2/2016 | Voellmy | ..... | H04L 45/74 370/392 |
| 2016/0094357 A1* | 3/2016 | Yamato | ..... | H04L 45/745 370/241 |
| 2017/0353485 A1* | 12/2017 | Brown | ..... | H04L 63/1433 |

* cited by examiner

MANAGEMENT OF UNREACHABLE OPENFLOW RULES

CROSS-REFERENCE TO RELATED APPLICATIONS

This application is a Continuation application of co-pending U.S. patent application Ser. No. 14/716,292 filed on May 19, 2015 incorporated herein by reference in its entirety.

BACKGROUND

Technical Field

The present invention relates generally to information processing and, in particular, to improving the management of unreachable OpenFlow (OF) rules.

Description of the Related Art

OpenFlow is a communications protocol that gives access to the forwarding plane of a network switch or router over a network. Physical switches supporting OpenFlow typically have limited ternary content addressable memories. For example, one particular switch that supports OpenFlow supports 750 OF rules.

Small TCAMs mean that the software defined network (SDN) controller needs to manage the space accordingly to reduce the rate of packet_in and rule re-installation. This adds complexity to the SDN controller since the SDN controller needs to add new rules and also determine what current rules will become unreachable and remove them.

In an SDN environment with a variety of services (even within the same controller), often different services (waypoint, L3, replication) may install rules of different priority that mask rules of lesser priority which then essentially become unreachable rules. These unreachable rules take up space in the ternary content addressable memory (TCAM) unless they are removed. The existence of unreachable rules in the TCAM makes debugging and diagnostics more complex since this means more rules must be examined.

SUMMARY

According to an aspect of the present principles, a method is provided. The method includes managing, by a software defined network (SDN) controller, OpenFlow rules stored on an OpenFlow network device having a ternary content addressable memory (TCAM). The OpenFlow rules include unreachable OpenFlow rules and reachable OpenFlow rules. The managing step includes querying at least one Openflow rule from among the unreachable OpenFlow rules and the reachable OpenFlow rules on the at least one OpenFlow network device. The managing step further includes determining whether any of the OpenFlow rules are reachable or unreachable from indicia used to mark the OpenFlow rules as reachable or unreachable. The managing step also includes causing a removal of the unreachable OpenFlow rules from the OpenFlow network device.

According to another aspect of the present principles, a system is provided. The system includes at least one OpenFlow network device having a ternary content addressable memory (TCAM). The OpenFlow network device (i) responds to queries for at least one OpenFlow rule from among unreachable OpenFlow rules and reachable OpenFlow rules on the at least one OpenFlow network device, (ii) marks OpenFlow rules on the OpenFlow network device as reachable or unreachable, and (iii) removes the unreachable rules from the OpenFlow network device.

According to yet another aspect of the present principles, a system is provided. The system includes at least one software defined network (SDN) controller for managing OpenFlow rules that include unreachable OpenFlow rules and reachable OpenFlow rules stored on at least one Openflow network device having a ternary content addressable memory (TCAM) by (i) querying at least one of the OpenFlow rules on the at least one OpenFlow network device, (ii) determining whether an OpenFlow rule is reachable or unreachable from indicia used to mark the OpenFlow rules as reachable or unreachable, and (iii) causing the removal of the unreachable rules from the at least one OpenFlow network device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
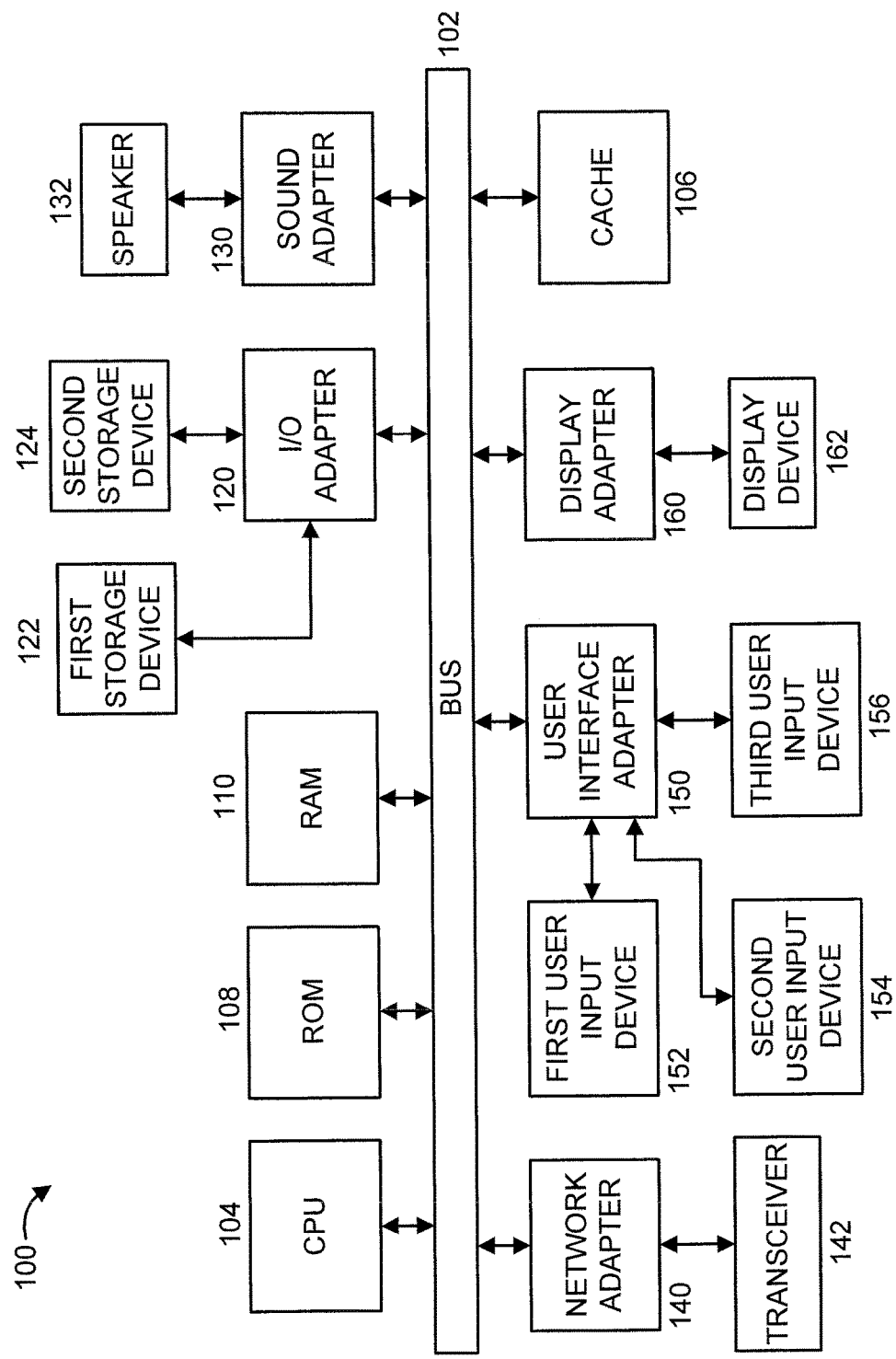
FIG. 1 shows an exemplary processing system 100 to which the present principles may be applied, in accordance with an embodiment of the present principles.

The present principles are directed to improving the management of unreachable OpenFlow (OF) rules. As used herein, the terms "unreachable OpenFlow rule" and "unreachable rule" refer to a rule that is logically unreachable, that is, under no circumstances can the rule be used to forward a packet. In other words, if a given rule is applicable to a given packet, it is certain that there are one or more preceding rules that also apply to the packet and, as a result, the given rule never gets applied to the packet. An OpenFlow rule can be unreachable if, for example, the OpenFlow rule is deleted, removed, or overwritten by another OpenFlow rule.

In an embodiment involving an OpenFlow network device having a ternary content addressable memory (TCAM) and involving a SDN controller, one or more of the following can be provided/enabled by the present principles. (1) The SDN controller can flush all unreachable OpenFlow rules from the TCAM using a single command.

(2) The SDN controller can query all the unreachable or all unreachable OpenFlow rules on the OpenFlow device using a single command.

(3) The SDN controller can determine whether an OpenFlow rule is reachable or not. In an embodiment, each rule is marked "reachable" or "unreachable". In an embodiment, the rules are marked by the OpenFlow network device.

(4) The SDN controller can receive a RULE_UNREACH notification from the OpenFlow network device when a rule becomes unreachable. The notification indicates that a particular rule is unreachable.

(5) The SDN controller can receive a RULE_REACH notification from the OpenFlow device when a rule becomes reachable. The notification indicates that a particular rule is reachable.

(6) The SDN controller can configure the OpenFlow network device to auto-remove a rule once it becomes unreachable so that certain rules or sets of rules can be auto-removed while others are not.

(7) In one implementation, the OpenFlow network device is able to cache unreachable rules in non-TCAM memory and re-load a rule into the TCAM when the rule logically becomes reachable once again.

Thus, one or more embodiments described herein are directed to an OpenFlow network device having a ternary content address memory (TCAM). In fact, although the present principles are particularly useful for devices that have a TCAM, the present principles are also applicable to and useful for OpenFlow devices that do not have a TCAM. In particular, the present principles can be used in a virtual Ethernet switch, such as the Linux Bridge or Open vSwitch. Such switches are implemented in software running on general purpose computers (that do not have a TCAM). Greater benefits accrue in the case where the OpenFlow device has a TCAM, due to the generally limited capacity of a TCAM. However, the present principles are still useful in the case where OpenFlow rules are stored in a conventional memory (DRAM).

Moreover, while the present principles are described in the context of OpenFlow rules, it is apparent to one of skill in the art that the present principles can be applied to essentially any packet processing rules that are substantially similar to OpenFlow, while maintaining the spirit of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
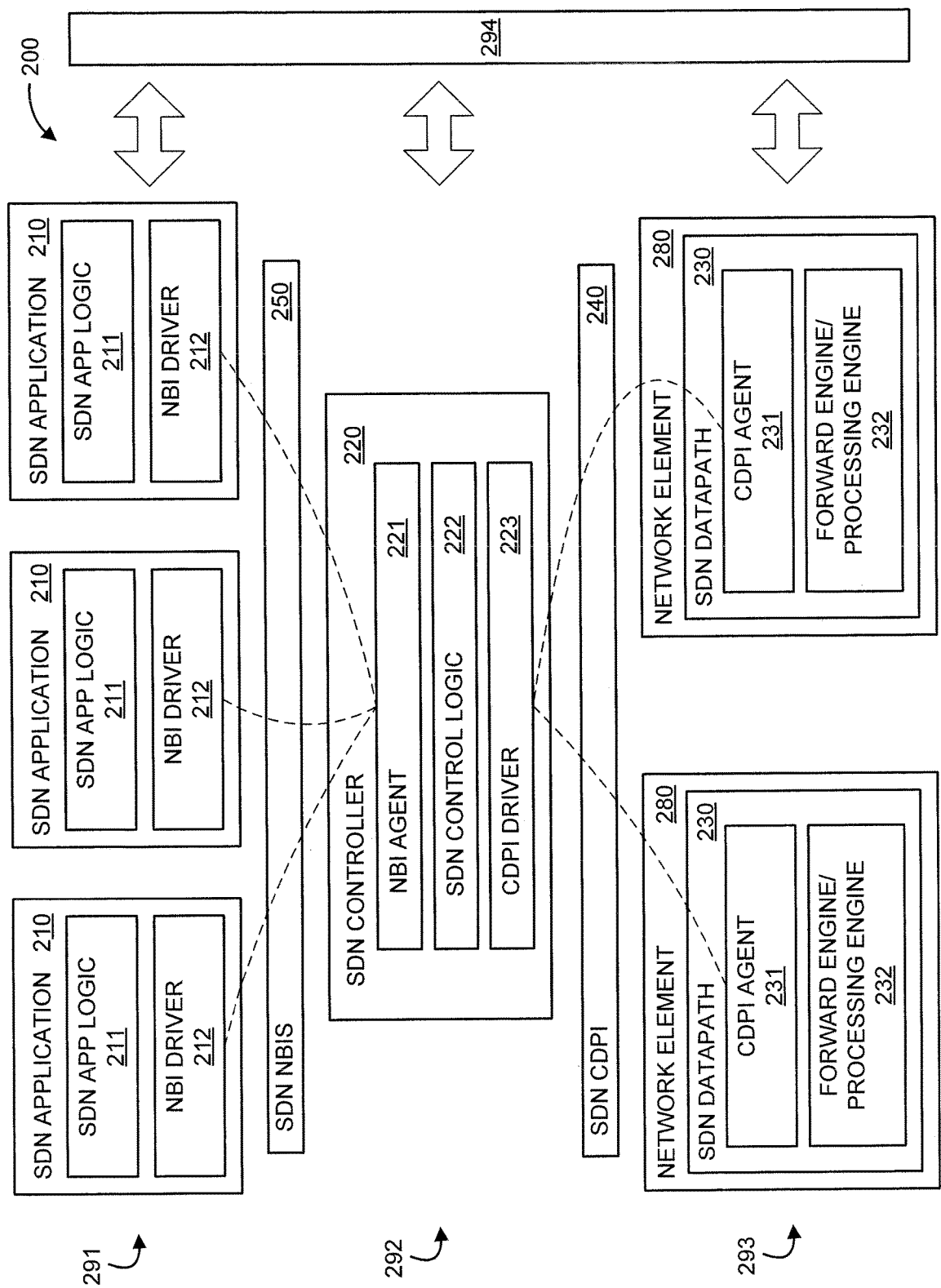
FIG. 2 shows an exemplary system 200 for managing unreachable OpenFlow rules, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
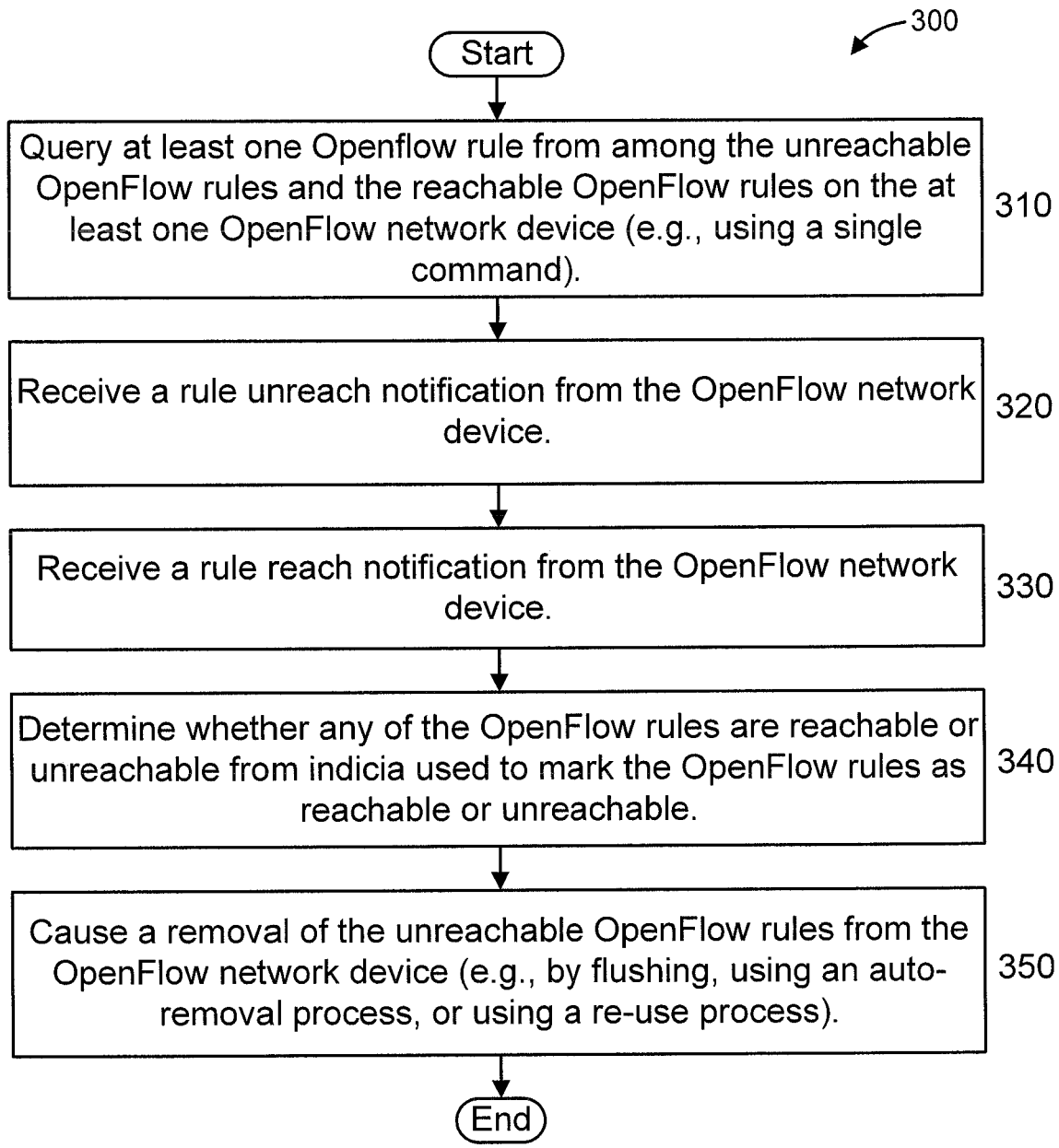
FIG. 3 shows an exemplary method 300 for managing OpenFlow rules stored on an OpenFlow network device having a ternary content addressable memory (TCAM), in accordance with an embodiment of the present principles.
Figure 4:
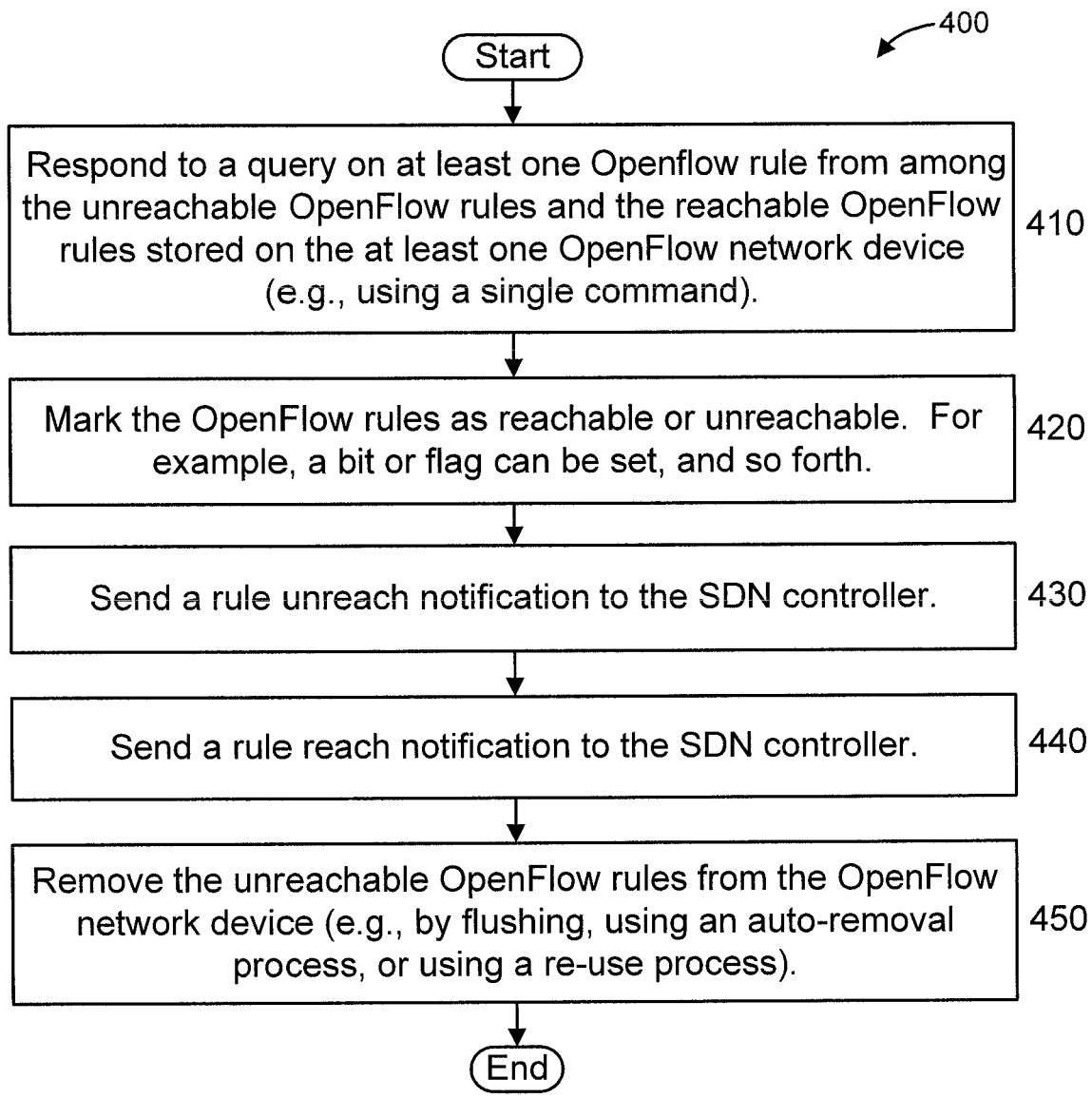
FIG. 4 shows an exemplary method 400 for managing OpenFlow rules stored on an OpenFlow network device having a ternary content addressable memory (TCAM), in accordance with an embodiment of the present principles.

Further, it is to be appreciated that processing system 100 may perform at least part of the method described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

FIG. 2 shows an exemplary system 200 for managing unreachable OpenFlow rules, in accordance with an embodiment of the present principles. In the embodiment of FIG. 2, system 200 is a software defined network. The system 200 includes an application plane 291, a control plane 292, a data plane 293, and a management and administration plane 294.

The system 200 includes SDN applications 210, an SDN controller 220, SDN Datapaths 230, an SDN Control to Data-Plane Interface (CDPI) 240, and SDN Northbound Interfaces (NBI) 250.

The SDN Applications 210 are programs that explicitly, directly, and programmatically communicate their network requirements and desired network behavior to the SDN Controller 220 via a northbound interface (NBI). In addition, the SDN Applications 210 can consume an abstracted view of the network for their internal decision making purposes. Each of the SDN Applications can include an SDN Application (APP) Logic 211 and one or more NBI Drivers 212. The SDN Applications 210 can themselves expose another layer of abstracted network control, thereby offering one or more higher-level NBIs through respective NBI agents.

The SDN Controller 220 translates the requirements from the SDN Application layer down to the SDN Datapaths and provides the SDN Applications 210 with an abstract view of the network (which may include statistics and events). The SDN Controller 220 includes one or more NBI Agents 221, an SDN Control Logic 222, and a Control to Data-Plane Interface (CDPI) driver 223.

In an embodiment, the SDN controller 220 is a logically centralized entity. However, in another embodiment, a set of multiple SDN controllers can be used. The controllers can be connected in a hierarchical configuration. Communication interfaces can be used between the controllers. Virtualization or slicing of network resources can be performed in consideration of the controllers.

The SDN Datapaths 230 are logical network devices that exposes visibility and uncontended control over its advertised forwarding and data processing capabilities. The logical representation may include all or a subset of the physical substrate resources. An SDN Datapath 230 includes a CDPI agent 231 and a set of one or more traffic forwarding engines and zero or more traffic processing functions (the traffic forwarding engines and traffic processing engines collectively denoted herein by the reference numeral 232). These engines and functions 232 may include simple forwarding between the datapath's external interfaces or internal traffic processing or termination functions. One or more SDN Datapaths 230 can be included in a single (physical) network element, as an integrated physical combination of communications resources, managed as a unit. An SDN Datapath 230 can also be defined across multiple physical network elements. The SDN Datapath 230 can be implemented to involve one or more of the following: logical to physical mapping; management of shared physical resources; virtualization or slicing of the SDN Datapath; interoperability with non-SDN networking; and data processing functionality. The SDN Datapaths 230 are included within network elements 280.

The SDN CDPI 240 is the interface defined between an SDN Controller and an SDN Datapath, which provides at least (i) programmatic control of all forwarding operations, (ii) capabilities advertisement, (iii) statistics reporting, and (iv) event notification. One value of SDN resides in the expectation that the CDPI 240 is implemented in an open, vendor-neutral and interoperable way.

The SDN NBIs 250 are interfaces between the SDN Applications 210 and the SDN Controller(s) 220 and typically provide abstract network views and enable direct expression of network behavior and requirements. This may occur at any level of abstraction (latitude) and across different sets of functionality (longitude). One value of SDN resides in the expectation that these interfaces are implemented in an open, vendor-neutral and interoperable way.

The SDN applications 210 exist in the application plane 291 and communicate their requirements via their NBI drivers 212. The control plane 292 includes the SDN controller 220 that translates these requirements and exerts control over the SDN Datapaths 230 while providing relevant information to the SDN applications 210. The data plane 293 includes network elements 280 whose SDN Datapaths 230 expose their capabilities through their CDPI agents 231. The management and administration plane 294 sets up the network elements 280, assigns the SDN Datapaths 230 to their SDN controller 220, and configures control policies regarding control afforded to the SDN controller 220 and/or any of the SDN applications 210.

In the embodiment shown in FIG. 2, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, while only one SDN controller is shown, other embodiments can involve multiple SDN controllers. These and other variations of the elements of system 200 are readily determined by one of ordinary skill in the art, given the teachings of the present principles provided herein, while maintaining the spirit of the present principles.

FIG. 3 shows an exemplary method 300 for managing OpenFlow rules stored on an OpenFlow network device having a ternary content addressable memory (TCAM), in accordance with an embodiment of the present principles. The method 300 can be performed by, for example, a software defined network (SDN) controller (e.g., SDN controller 220 in FIG. 2) that is signal communication with the OpenFlow network device (e.g., any of network elements 280 in FIG. 2). In an embodiment, the SDN control logic 222 of the SDN controller 220 can perform the method 300. The OpenFlow rules include unreachable OpenFlow rules and reachable OpenFlow rules.

At step 310, query at least one OpenFlow rule from among the unreachable OpenFlow rules and the reachable OpenFlow rules on the at least one OpenFlow network device. In an embodiment, the at least one OpenFlow rule is queried using a single command.

At step 320, receive a rule unreach notification from the OpenFlow network device. The notification can be sent, e.g., when an OpenFlow rule becomes unreachable or in response to a query (e.g., the query in step 310). The notification essentially informs the SDN controller that a particular rule is unreachable.

At step 330, receive a rule reach notification from the OpenFlow network device. The notification can be sent, e.g., when an OpenFlow rule becomes reachable or in response to a query (e.g., the query in step 310). The notification essentially informs the SDN controller that a particular rule is reachable.

At step 340, determine whether any of the OpenFlow rules are reachable or unreachable from indicia used to mark the OpenFlow rules as reachable or unreachable. In an embodiment, step 340 can use a rule unreach notification or a rule reach notification to determine the status (reachable or unreachable) of a given OpenFlow rule.

At step 350, cause a removal of the unreachable OpenFlow rules from the OpenFlow network device. In an embodiment, step 350 can be performed in response to a determination (or multiple determinations) provided by step 340 (indicative of one or more unreachable OpenFlow rules) or can be performed on some other basis (e.g., periodically, randomly, etc.). Thus, step 350 can be performed automatically in response to one or more criterion (e.g., one or more determinations provide by step 340, the passage of a predetermined time period(s), a random basis) and/or can be performed manually, that is, can be initiated by a user's manual input (e.g., a command to remove, flush, etc.). In the latter case, a network administrator or other person/entity can determine that a removal is warranted at a given (e.g., unscheduled) time and issue a command that causes the removal of the unreachable OpenFlow rules from the OpenFlow network device. The preceding variations described with respect to step 350 can apply to any of the following exemplary ways for performing step 350 (flushing, auto-remove, re-use).

In an embodiment, step 350 can include causing a flushing of the unreachable OpenFlow rules from the TCAM. In an embodiment, the SDN controller can issue a command (e.g., a single command) to flush the TCAM. In an embodiment, the SDN controller can configure the OpenFlow network device to perform the flushing.

In an embodiment, step 350 can include configuring the OpenFlow device to employ an auto-removal process that automatically removes an OpenFlow rule when the OpenFlow rule becomes unreachable. In an embodiment, only certain selected OpenFlow rules or sets of OpenFlow rules are configured for auto-removal. In this way, those not so configured cannot be auto-removed.

In an embodiment, step 350 can include configuring the OpenFlow device to employ a re-use process that removes the OpenFlow rule from the TCAM and caches the OpenFlow rule in a non-TCAM memory when the OpenFlow rule becomes unreachable, and reloads the OpenFlow rule into the TCAM when the OpenFlow rule becomes reachable. In this way, previously unreachable OpenFlow rules can be re-used once they become reachable again.

FIG. 4 shows an exemplary method 400 for managing OpenFlow rules stored on an OpenFlow network device having a ternary content addressable memory (TCAM), in accordance with an embodiment of the present principles. The method 400 can be performed by, for example, the OpenFlow network device (e.g., any of network elements 280 in FIG. 2). In an embodiment, the CDPI agent 231 of a network element 280 can perform the method 400. The OpenFlow rules include unreachable OpenFlow rules and reachable OpenFlow rules.

At step 410, respond to a query on at least one OpenFlow rule from among the unreachable OpenFlow rules and the reachable OpenFlow rules stored on the at least one OpenFlow network device. In an embodiment, the at least one OpenFlow rule is queried using a single command.

At step 420, mark the OpenFlow rules as reachable or unreachable. For example, a bit or flag can be set, and so forth. Step 420 can performed in response to a query (e.g., the query in step 410), automatically (e.g., at predetermined times, randomly, as rule statuses change (from unreachable to reachable and vice versa)), manually (that is, in response to an input initiating the marking process), and/or on some other basis.

At step 430, send a rule unreach notification to the SDN controller. The notification can be sent, e.g., when an OpenFlow rule becomes unreachable or in response to a query (e.g., the query in step 410). The notification essentially informs the SDN controller that a particular rule is unreachable.

At step 440, send a rule reach notification to the SDN controller. The notification can be sent, e.g., when an OpenFlow rule becomes reachable or in response to a query (e.g., the query in step 410). The notification essentially informs the SDN controller that a particular rule is reachable.

At step 450, remove the unreachable OpenFlow rules from the OpenFlow network device. In an embodiment, step 450 can be performed in response to a marking (or multiple determinations) performed by step 420 (indicative of one or more unreachable OpenFlow rules) or can be performed on some other basis (e.g., periodically, randomly, etc.). Thus, step 450 can be performed automatically in response to one or more criterion (e.g., one or more markings performed by step 420, the passage of a predetermined time period(s), a random basis) and/or can be performed manually, that is, can be initiated by a user's manual input (e.g., a command to remove, flush, etc.). In the latter case, a network administrator or other person/entity can determine that a removal is warranted at a given (e.g., unscheduled) time and issue a command that causes the removal of the unreachable OpenFlow rules from the OpenFlow network device.

In an embodiment, step 450 can include flushing the unreachable OpenFlow rules from the TCAM. In an embodiment, the OpenFlow network device can respond to a command (e.g., a single command) issued by the SDN controller to flush the TCAM. In an embodiment, the OpenFlow network device can be configured (e.g., by the SDN controller) to perform the flushing.

In an embodiment, step 450 can include the OpenFlow device employing an auto-removal process that automatically removes an OpenFlow rule when the OpenFlow rule becomes unreachable. In an embodiment, only certain selected OpenFlow rules or sets of OpenFlow rules are configured for auto-removal.

In an embodiment, step 450 can include the OpenFlow device employing a re-use process that removes the OpenFlow rule from the TCAM and caches the OpenFlow rule in a non-TCAM memory when the OpenFlow rule becomes unreachable, and reloads the OpenFlow rule into the TCAM when the OpenFlow rule becomes reachable. In this way, previously unreachable OpenFlow rules can be re-used once they become reachable again.

A description will now be given regarding some exemplary benefits provided by the present principles. Of course, the proceeding benefits are merely illustrative and, given the teachings of the present principles provided herein, one of ordinary skill in the art will readily contemplate these and other benefits.

A benefit provided by the present principles is easier TCAM space management for the SDN controller when the SDN controller needs to decide which rules to evict from the TCAM.

Another benefit provided by the present principles relates to diagnostics and debugging. The SDN controller can query the OF device for reachable/unreachable rules and compare what the OF devices states is reachable/unreachable to what the controller considered reachable/unreachable and identify any discrepancies.

Yet another benefit is that since only the reachable rules can affect traffic, only reachable rules need to be examined during debugging and diagnostic, thereby reducing the number of rules to examine and accordingly simplifying such tasks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
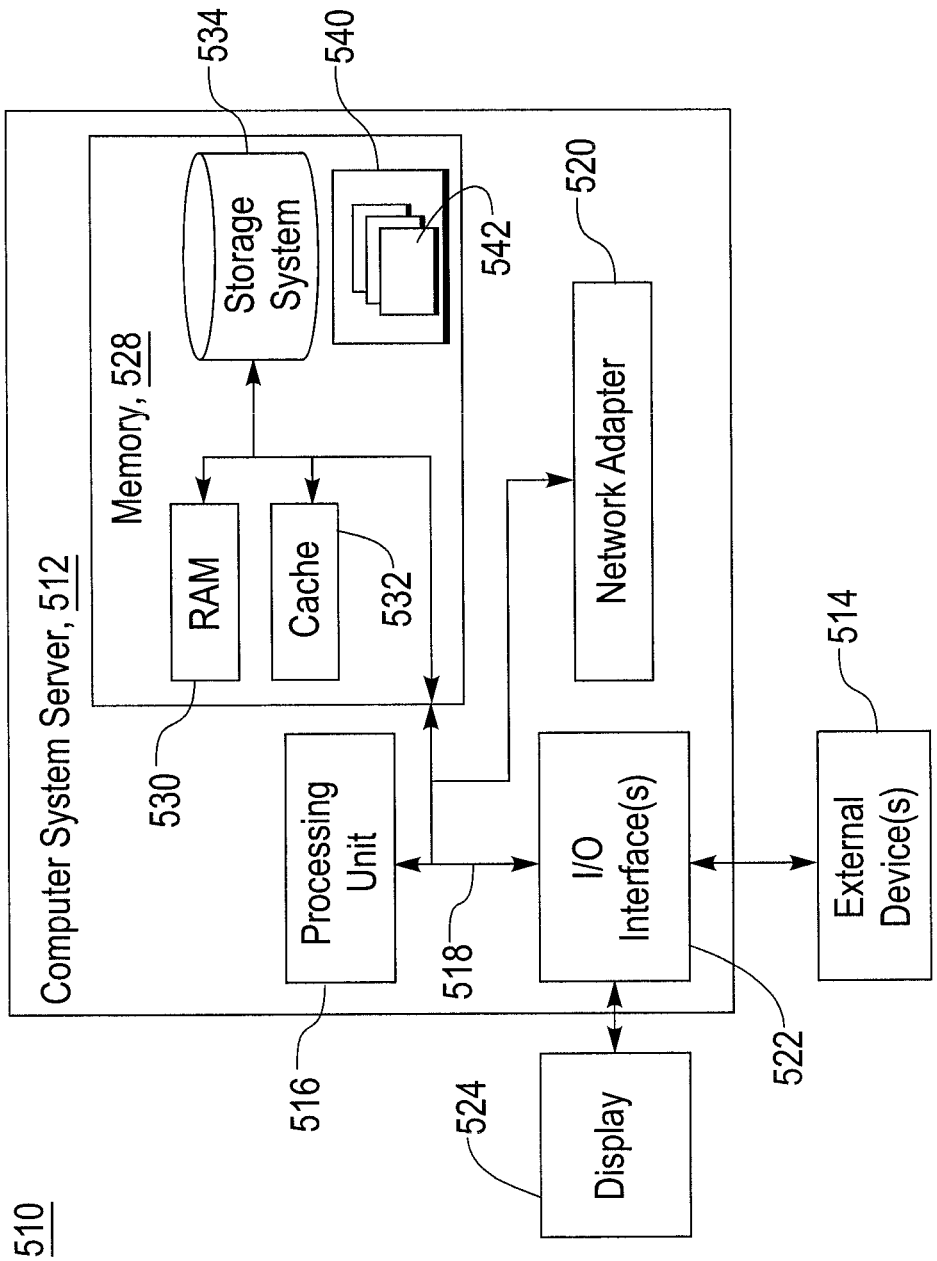
FIG. 5 shows an exemplary cloud computing node 510, in accordance with an embodiment of the present principles.

Referring now to FIG. 5, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
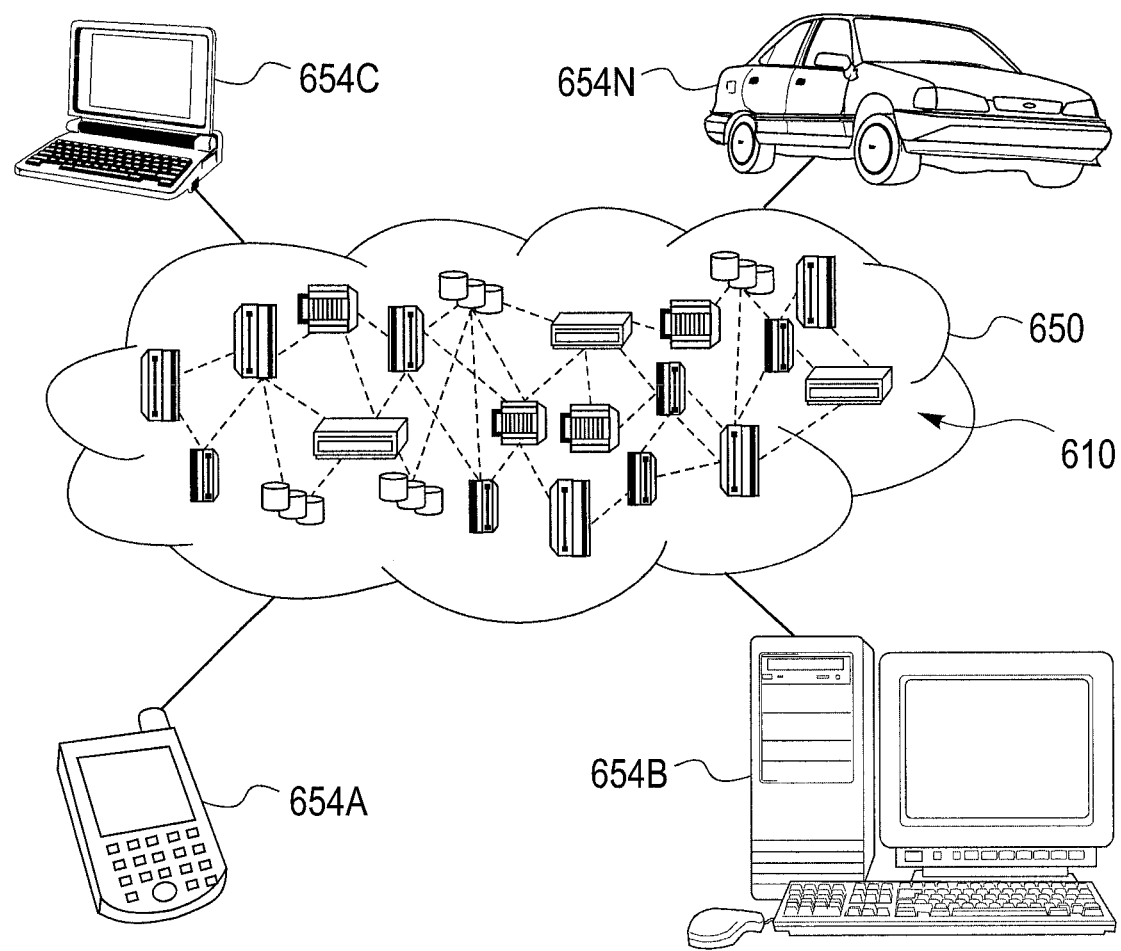
FIG. 6 shows an exemplary cloud computing environment 650, in accordance with an embodiment of the present principles.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
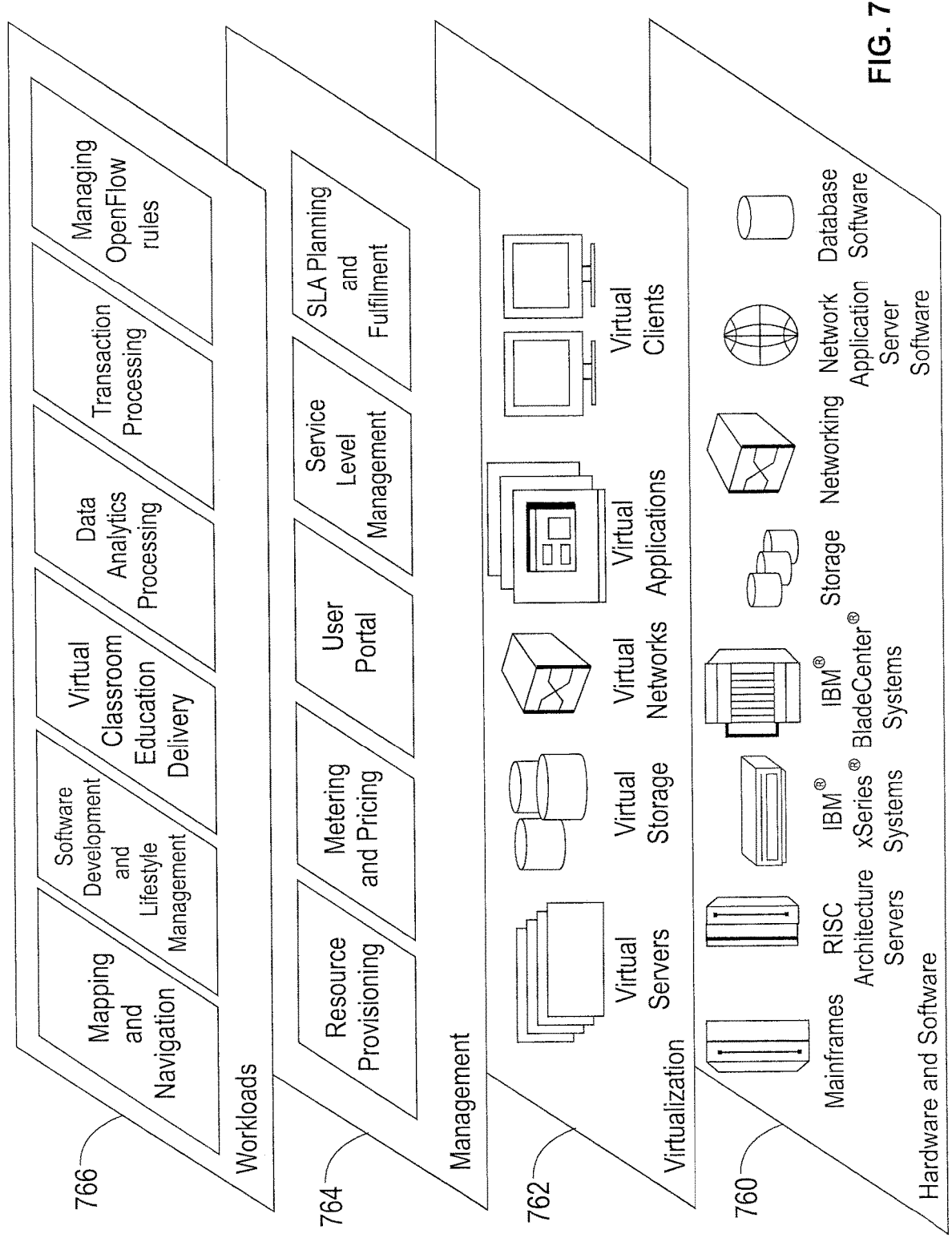
FIG. 7 shows exemplary abstraction model layers, in accordance with an embodiment of the present principles.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing OpenFlow rules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    managing, by a software defined network (SDN) controller, OpenFlow rules stored on an OpenFlow network device in a ternary content addressable memory (TCAM), the OpenFlow rules including logically unreachable OpenFlow rules and reachable OpenFlow rules, the logically unreachable OpenFlow rules including OpenFlow rules that have been deleted, removed, or overwritten by another OpenFlow rule in the TCAM of the OpenFlow network device,
    wherein said managing step comprises:
        querying at least one OpenFlow rule from among the logically unreachable OpenFlow rules and the reachable OpenFlow rules on the at least one OpenFlow network device;
        determining whether any of the OpenFlow rules are currently reachable or unreachable from indicia used to mark the OpenFlow rules as reachable or unreachable; and
        flushing all of the currently unreachable OpenFlow rules from the TCAM of the OpenFlow network device, and storing the flushed OpenFlow rules in a first non-TCAM,
    wherein the logically unreachable OpenFlow rules are updated using a re-use process, the re-use process comprising removing an OpenFlow rule from the TCAM and caching the OpenFlow rule in a second non-TCAM when the OpenFlow rule becomes logically unreachable, and reloading the OpenFlow rule into the TCAM upon receiving a notification that the OpenFlow rule has again become reachable.

2. The method of claim 1, wherein said querying step queries the at least one OpenFlow rule using a single command.

3. The method of claim 1, wherein said causing step comprises causing a flushing of the unreachable OpenFlow rules from the TCAM.

4. The method of claim 3, wherein the unreachable OpenFlow rules are flushed from the TCAM using a single command.

5. The method of claim 1, wherein said causing step comprises configuring the OpenFlow device to auto-remove an OpenFlow rule when the OpenFlow rule becomes unreachable.

6. The method of claim 5, wherein only certain selected OpenFlow rules or sets of OpenFlow rules are configured for auto-removal.

7. The method of claim 1, further comprising receiving a rule unreach notification from the OpenFlow network device when the OpenFlow rule becomes unreachable.

8. The method of claim 1, further comprising receiving a rule reach notification from the OpenFlow network device when the OpenFlow rule becomes reachable.

* * * * *